United States Patent
Todorovic (10) Patent No.: US 10,634,006 B2
(45) Date of Patent: Apr. 28, 2020

(54) GUIDE VANE OF A GAS TURBINE ENGINE, IN PARTICULAR OF AN AIRCRAFT ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 493 days.

(21) Appl. No.: 15/194,797

(22) Filed: Jun. 28, 2016

(65) Prior Publication Data

US 2017/0002685 A1 Jan. 5, 2017

(30) Foreign Application Priority Data

Jul. 1, 2015 (DE) .......................... 10 2015 110 615

(51) Int. Cl.
*F01D 25/12* (2006.01)
*F01D 9/06* (2006.01)
(Continued)

(52) U.S. Cl.
CPC .............. *F01D 25/12* (2013.01); *F01D 9/02* (2013.01); *F01D 9/065* (2013.01); *F01D 9/041* (2013.01);
(Continued)

(58) Field of Classification Search
CPC ... F01D 9/00; F01D 9/02; F01D 9/065; F01D 9/04; F01D 9/041; F01D 25/08; F01D 25/12; F05D 2260/201; F05D 2260/213; F05D 2260/22141; F05D 2240/121; F02C 7/14; F02C 7/18
See application file for complete search history.

(56) References Cited

U.S. PATENT DOCUMENTS

| 3,291,447 A | 12/1966 | Brandon |
| 5,197,852 A | 3/1993 | Walker et al. |

(Continued)

FOREIGN PATENT DOCUMENTS

| CA | 2503139 A1 | 5/2004 |
| DE | 1255113 B | 11/1967 |

(Continued)

OTHER PUBLICATIONS

European Search Report dated Dec. 9, 2016 for counterpart European Application No. 16175553.3.

(Continued)

*Primary Examiner* — Moshe Wilensky
*Assistant Examiner* — Elton K Wong
(74) *Attorney, Agent, or Firm* — Shuttleworth & Ingersoll, PLC; Timothy J. Klima (57) ABSTRACT

A guide vane of a gas turbine engine, in particular of an aircraft engine, which has a pressure-side wall, a suction-side wall, a guide vane root, a guide vane tip, a guide vane leading edge area that is impinged by a cooling air flow of a cooling system, a guide vane trailing edge area that is facing away from the guide vane leading edge area, and at least one channel for conducting a fluid to be cooled arranged in an internal space of the guide vane. At that, during operation of the gas turbine engine, a first part of the cooling air flow flows around a pressure-side wall, and a second part of the cooling air flow flows around the suction-side wall, and a third part of the cooling air flow flows through the internal space including the channel. What is further suggested is a gas turbine engine with at least one such static guide vane.

13 Claims, 4 Drawing Sheets

(51) Int. Cl.
  F01D 9/02   (2006.01)
  F02C 7/18       (2006.01)
  F01D 9/04       (2006.01)
  F02C 7/14       (2006.01)
  F02K 3/06       (2006.01)

(52) U.S. Cl.
  CPC .............. F02C 7/14 (2013.01); F02C 7/18 (2013.01); F02K 3/06 (2013.01); F05D 2220/323 (2013.01); F05D 2220/36 (2013.01); F05D 2240/12 (2013.01); F05D 2240/121 (2013.01); F05D 2240/122 (2013.01); F05D 2250/185 (2013.01); F05D 2260/201 (2013.01); F05D 2260/213 (2013.01); F05D 2260/22141 (2013.01); Y02T 50/676 (2013.01)

(56) References Cited

U.S. PATENT DOCUMENTS

| | | | |
|---|---|---|---|
| 7,900,437 B2 | 3/2011 | Venkataramani et al. | |
| 8,323,552 B2 | 12/2012 | Bellar | |
| 8,616,833 B2 | 12/2013 | Dahlhaug | |
| 2006/0042223 A1* | 3/2006 | Walker | F01D 9/065 60/39.08 |
| 2010/0300066 A1* | 12/2010 | Bulin | F01D 9/065 60/267 |
| 2014/0255200 A1 | 9/2014 | Guo et al. | |
| 2015/0023776 A1 | 1/2015 | Ribarov et al. | |
| 2015/0315923 A1* | 11/2015 | Bordoni | F01D 9/04 415/175 |
| 2019/0078452 A1 | 3/2019 | Zaccardi et al. | |

FOREIGN PATENT DOCUMENTS

| | | |
|---|---|---|
| EP | 1630358 A2 | 3/2006 |
| EP | 2383437 A2 | 11/2011 |

OTHER PUBLICATIONS

German Search Report dated May 18, 2016 from counterpart German App No. 10 2015 110 615.9.

\* cited by examiner

GUIDE VANE OF A GAS TURBINE ENGINE, IN PARTICULAR OF AN AIRCRAFT ENGINE

The invention relates to a guide vane of a gas turbine engine, in particular of an aircraft engine, comprising a cooling of fluids that are conducted through the guide vane according to the kind as it is defined more closely herein, as well as a gas turbine engine with at least one static guide vane that is embodied in such manner.

In aircraft engines, oil is usually used for lubricating and cooling various engine components such as bearings, gears, electrical generators etc. Besides, other fluids such as chlorodifluormethane or tetrafluoroethane are also used for cooling purposes. During operation of the aircraft engine, the oil or fluid heats up, which is why an efficient cooling of the oil and of the engine components inside of which oil is conducted, for example guide vanes that are arranged downstream of a fan, is necessary.

A conventional way of cooling oil is air cooling. Thus, surface cooling is performed for achieving the desired cooling effect in guide vanes as they are used in practice and through which oil to be cooled is conducted, wherein a part of the thermal energy that is contained in the oil to be cooled is emitted via the guide vane body into an air flow which flows around the same.

Here, a permanent surface cooling during operation, where the bodies around which the air is flows are arranged at engine walls and possibly comprise ribs for the purpose of increasing the surface area and the heat exchange, is just as possible as so-called matrix cooling with a mostly regulated air flow that is extracted from a main flow path.

U.S. Pat. No. 8,616,833 B2 shows a guide vane through which oil to be cooled flows during operation of an aircraft engine. During through-flow, a part of the oil's thermal energy is absorbed by the guide vane body and emitted by the same to an air flow that is flowing around the guide vane body. As a result, the fluid is partially cooled.

A comparable cooling principle is realized in U.S. Pat. No. 8,323,552 B2. Here, the guide vane is provided with cooling channels through which the fluid to be cooled flows during operation of the aircraft engine. Cooling fins are attached on the surface of the guide vanes in order to increase the heat transfer and thus the cooling performance from the guide vane which is heated up by the fluid to be cooled to the air flow that is surrounding the guide vane.

Further, it is known from U.S. Pat. No. 7,900,437 B2 to additionally design the cross section of the conduits through which the fluid to be cooled flows in such a manner that it is as large as possible, so that a maximal amount of fluid to be cooled can be passed through the guide vane, thus enhancing the cooling performance of the cooling system.

However, a disadvantage of all aforementioned solutions is that the cooling performance which can be achieved in this way is not sufficient in modern geared fan aircraft engines, which are also referred to as geared turbo fan (GTF) and counter rotating open rotors (CROR). As for geared fan aircraft engines, they generate considerable amounts of frictional and thermal energy during operation, wherein this thermal energy has to be discharged from the aircraft engine. However, the cooling air mass flow that is available for flowing around the guide vanes as well as the expandability of the cross section of the channels through which the oil to be cooled is flowing is limited.

Thus, the present invention is based on the objective to provide a guide vane of an aircraft engine by means of which the cooling performance or cooling efficiency is enhanced as compared to known cooled guide vanes.

This objective is achieved through a guide vane of a gas turbine engine, in particular of an aircraft engine, as disclosed herein.

What is therefore suggested is a guide vane of a gas turbine engine, in particular of an aircraft engine, having a pressure-side wall, a suction-side wall, a guide vane root, a guide vane tip, a guide vane leading edge area that is impinged by a cooling air flow of a cooling system, a guide vane trailing edge area that is facing away from the guide vane leading edge area, as well as at least one channel for conducting a fluid to be cooled arranged in an internal space of the guide vane. Here, during operation of the gas turbine engine, a first part of the cooling air flow flows around the pressure-side wall and a second part of the cooling air flow flows around the suction-side wall. According to the invention it is provided that a third part of the cooling air flow flows around the internal space comprising the channel.

In contrast to the guide vanes as they are known from the state of the art, where the cooling air flow only flows externally along their pressure-side wall and suction-side wall during operation of an aircraft engine based on the principle of surface cooling, in the present invention a part of the cooling air flow additionally flows through the internal space, including the channel arranged therein, based on the principle of a matrix cooler.

The flow through the internal space of the guide vane results in a significant increase in cooling performance, since the third part of the cooling flow, which is conducted through the interior of the guide vane, flows around the channel through which the fluid to be cooled flows, as well as around the inner surfaces of the pressure-side wall and the suction-side wall, and a large part of the thermal energy can be transferred directly from the channel to the cooling air flow.

By thus providing an internal space inside the guide vane, through which a part of the cooling air flow can be conducted, the pressure-side wall is separated from the suction-side wall by means of at least one cavity, and all surfaces can contribute to the cooling of the fluid-conducting channel, which results in a kind of hybrid cooler comprising both surface cooling and matrix cooling.

Thus, the structure of a guide vane according to the invention makes it possible to maintain a smooth aerodynamic surface design, which, in addition to the inner heat exchange, supports efficient cooling through surface cooling. Besides, the cavity design is advantageous with respect to weight reduction and thus the total level of efficiency.

According to an advantageous embodiment of the guide vane according to the invention, at least one air inlet opening can be arranged in the guide vane leading edge area, and at least one air outlet opening can be arranged in the guide vane trailing edge area in order to make the cooling air flow flow through the internal space.

Such an arrangement of the air inlet opening and the air outlet opening has the advantage that the cooling air flow travels a maximally long distance through the internal space of the guide vane, whereby the heat absorption by the cooling air flow is increased. In addition, the arrangement of the air outlet opening in the guide vane trailing edge area is advantageous insofar as it results in thrust generation when the cooling air flows out of the internal space of the guide vane.

The third part of the cooling air flow that is conducted through the interior of the guide vane is heated up as it flows through the internal space of the guide vane. As a result, the heated-up cooling air flow has a higher velocity when exiting the internal space of the guide vane through the air outlet opening as compared to when it enters the air inlet opening of the guide vane. The thrust that is thus generated from the thermal energy of the fluid to be cooled advantageously contributes to the total thrust of a gas turbine engine that is embodied as an aircraft engine.

Further, the arrangement of the air outlet opening in the guide vane trailing edge area has the advantage that this contributes to a reduction of undesired wake turbulences downstream of the guide vane trailing edge area.

In the context of the present invention, said air inlet opening can be a single opening that extends across a certain section of the guide vane leading edge area, as well as a plurality of separate air inlet openings.

According to an advantageous embodiment of the guide vane according to the invention, a particle deflector against harmful particles in the cooling air flow can be provided in the area of the at least one air inlet opening.

Harmful particles can pass through the fan or blower together with the air flow entering the gas turbine engine and impinge on a guide vane that is located downstream of the fan in the flow direction. If larger particles are conveyed in that part of the cooling air flow which is conducted through the internal space of the guide vane, they may cause damage to the guide vane or lead to the air inlet opening being clogged. In a corresponding particle deflector, larger harmful particles impinge onto the particle deflector frontally due to their inertia. As this occurs, they can be deflected by the particle deflector in the direction of the suction side or in the direction of the pressure side of the guide vane, without causing any damage to the guide vane.

Thus, the particle deflector can be expediently formed as a cooling air flow diverter, by means of which the direction of the third part of the cooling air flow which is introduced into the internal space is changed as the third part of the cooling air flow flows in.

The particle deflector can be a fully integral part of the static outlet guide vane arrangement, or it can form a separate component group, which can for example According to an advantageous embodiment of the guide vane according to the invention, the cooling air flow diverter can be formed with a lip that protrudes over the at least one air inlet opening in the area of the guide vane leading edge area.

Such a lip is a constructively simple solution to ensure that the guide vane leading edge area is formed in a streamlined manner. With the protruding design of the lip, a simple division of the cooling air flow can be achieved to that effect that the first and second part of the cooling air flow flowing around the exterior of the guide vane flows to the pressure-side or the suction-side wall in a low-loss manner, and that at the same time the third part of the cooling air flow can reach the internal space of the guide vane.

In addition, the lip fulfills the above-mentioned protective function, keeping harmful particles from entering the interior of the guide vane.

The lip can protrude over the at least one air inlet opening determined by the clearance between the pressure-side wall and the suction-side wall or vice versa, namely in such a manner that the inflowing third part of the cooling air flow flows into the at least one air inlet opening between the lip and the pressure-side wall with a flow direction that is substantially oriented towards the suction-side wall.

Since in this case the air inlet opening is facing the pressure side and thus the first part of the cooling air flow, the third part of the cooling air flow is advantageously conveyed into the internal space of the guide vane through the pressure that is present at the pressure side and that is increased as compared to the suction side.

Principally, the lip can be connected to a pressure-side wall or to the suction-side wall of the guide vane, or can be formed in one piece with the same.

According to an advantageous embodiment of the invention, at least one rib can be arranged in the internal space of the guide vane for forming the cooling system, wherein this rib is preferably in contact with the pressure-side wall and/or with the suction-side wall.

For one thing, such a rib serves for supporting the pressure-side wall and the suction-side wall against each other, and thus for stiffening the guide vane. If one or multiple ribs are connected to the pressure-side and/or to the suction-side wall, this not only has the additional advantage that the external channel surface, around which the third part of the cooling air flow that is conducted into the interior of the guide vane flows, is enlarged by the ribs, leading to an enhanced heat transfer from the channel via the ribs to the cooling air flow in the interior of the guide vane. But also heat from the rib or the ribs is transferred through direct contact to the pressure-side wall or the suction-side wall and can be emitted by the respective walls to the first or second part of the cooling flow that flows around them externally. In this way, the ribs that are connected to the outer walls are also involved in surface cooling at the external sides, thus increasing the heat efficiency. Expediently, the ribs are made of a material with a good heat transfer capacity, such as an aluminum or copper alloy, for example.

According to a further embodiment of the invention, the at least one rib can extend at least approximately in a direction from the guide vane leading edge area towards the guide vane trailing edge area.

In this way it is ensured that, for one thing, the third part of the cooling air flow is conducted through the internal space of the guide vane in an aerodynamically advantageous manner and that no undesired turbulences or flow losses occur. For another thing, by means of one such rib or multiple such ribs that are arranged in this manner, the heat transfer capacity from the heated-up ribs to that part of the cooling air flow that is conducted through the interior of the guide vane is enhanced. Moreover, the formation of wake turbulences downstream of the guide vane trailing edge area can additionally be counteracted through ribs of such design.

In an advantageous embodiment of the invention, the at least one rib can be in contact with the channel. Through the direct connection between the channel and the at least one rib, which can for example be created by welding, the heat transfer capacity from the heated-up channel to the rib is enhanced. In addition, in the guide vane according to the invention, the primary function of the guide vane is maintained, namely the straightening of the turbulence swirls that are caused by the fan that is arranged upstream of the guide vane.

In a further development of the invention, the at least one part of the channel can pass through the at least one rib. In this manner, the heat transfer capacity from the channel to the at least one rib is enhanced and the heat dissipation to that part of the cooling air flow that is conducted in the interior of the guide vane is correspondingly improved.

The channel can be arranged in the internal space of the guide vane so as to be linear at least in certain parts, or so as to be bent at least in certain parts. In a very advantageous embodiment of the invention, the channel can be arranged in the internal space of the guide vane in a meandering shape.

If the channel is arranged inside the internal space of the guide vane in a meandering shape, the channel can extend in one plane or can be curved and be approximately parallel to the curved suction-side wall and/or the curved pressure-side wall. Generally, a meandering design in the present sense comprises any loop-shaped or other curvature of the channel with any number of windings in all directions, wherein such a meandering design of the channel facilitates optimal conduction in the internal space of the guide vane as well as the realization of a maximal exterior surface of the channel for the purpose of achieving an optimal heat transfer from the outer channel surface to that part of the cooling flow that is conducted through the interior of the guide vane.

An inlet of the channel for taking in the fluid to be cooled from a hot fluid conduit and an outlet for discharging a cooled fluid into a cold fluid conduit can be arranged in the area of the guide vane root, which results in an advantageously compact design of the cooling circuit together with the hot fluid conduit and the cold fluid conduit.

In an advantageous embodiment, the internal space of the guide vane can be divided into multiple chambers. Such chambers may for example be formed by ribs extending from the guide vane leading edge area to the guide vane trailing edge area and the pressure-side and the suction-side wall. If the ribs are passed by the channel, a plurality of chambers are formed in the internal space of the guide vane together with the pressure-side and the suction-side wall.

Principally, chambers of different size and different geometry are possible. For example, multiple chambers can also be formed by bionic structures in the internal space of the guide vane. These bionic structures can for example be made of metallic material and can be manufactured by means of a metal laser sintering method or a 3D printing method or another suitable method for forming complex three-dimensional structures. Such complex structures which form multiple chambers in the internal space of the guide vane are advantageous for matrix cooling with a high cooling performance. Here, in particular when it comes to special or bionic shapes of ribs and chambers, the person skilled in the art will keep a balance between the minimally required structure with respect to the weight and flow losses, and the maximally desired structural design with respect to heat exchange and structural integrity.

A cooled guide vane according to the invention can be arranged in the by-pass channel of the gas turbine engine. The arrangement in the bypass channel of the gas turbine engine has the advantage that it has a positive effect on the cooling performance because the greater part of the of the air flow is conducted through the bypass channel. Thus, a large amount of cooling air is available in the bypass channel downstream of the fan and upstream of the guide vanes.

Alternatively, the guide vane can be arranged in the core flow channel of the gas turbine engine downstream of the fan in the flow direction, so that what is present is a guide vane that is referred to as an inlet guide vane or IGV. Thanks to the arrangement of the guide vane in the core flow channel, a compact design of this guide vane can be realized.

The features specified herein as well as the features specified in the following exemplary embodiment of the subject matter according to the invention are respectively suitable on their own or in any suitable combination with each other to further develop the subject matter according to the invention.

Further advantages and advantageous embodiments of the subject matter according to the invention follow and the exemplary embodiment that is described in principle in the following by referring to the drawings.

Herein.

Figure 1:
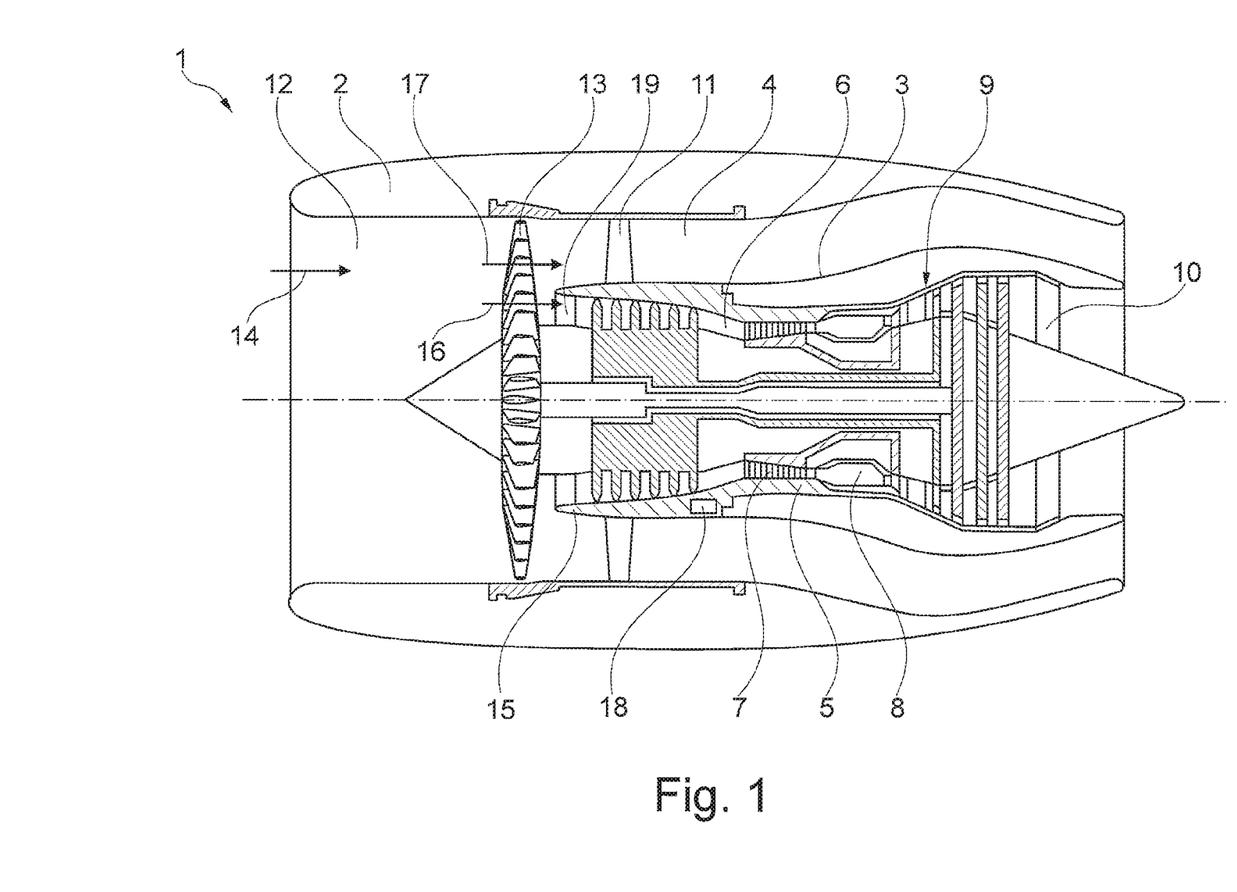
FIG. 1 shows a schematic rendering of a gas turbine engine that is embodied as an aircraft engine with an outlet guide vane arrangement (OGV) that is arranged in the bypass channel and that has cooled guide vanes according to of the invention.

Referring to FIG. 1, a gas turbine engine that is embodied as an aircraft engine 1 is shown, which is embodied in a conventional manner and has an engine cowling 2 that forms a bypass channel 4 together with an inner lateral wall 3, as well as an inner dividing wall 5 that limits a core flow channel 6 radially outwards. Located in the core flow channel 6 are compressors 7, a combustion chamber 8, a turbine 9 and a nozzle 10, with all of them being arranged around a central engine axis.

An air flow 14 enters the aircraft engine 1 via an inflow 12 and a fan 13, and is divided into a core flow 16 and a bypass flow 17 downstream of the fan 13 at a flow divider 15, from which an inner lateral wall 3 and the inner dividing wall 5 extend.

The inner dividing wall 5 extends in flow direction in such a way that it broadens in a conical manner, so that the necessary space for accommodating aggregates 18, such as for example a gear box, is created in the interior of the aircraft engine 1 between the core flow channel 6 and the bypass channel 4.

In the bypass channel 4, an outlet guide vane arrangement with multiple guide vanes 11 that are also referred to as OGV (outlet guide vanes) are provided, in which the bypass flow 17 forms a cooling air flow 17.

Apart from arranging the guide vanes 11 in the bypass channel 4, in an analogous embodiment they can also be arranged in the core flow channel 6 as so-called IGV (inlet guide vanes) or as inlet guide vane 19, with the core flow 16 forming the cooling air flow.

The shown guide vanes 11 in the bypass channel 4 do not have a full load-bearing function between the engine cowling 2 and the inner lateral wall 3. They primarily serve for straightening the turbulence-swirl-impacted air flow downstream of the fan 13. However, a stronger load-bearing function would be possible in a bionic internal space structure.

Figure 2:
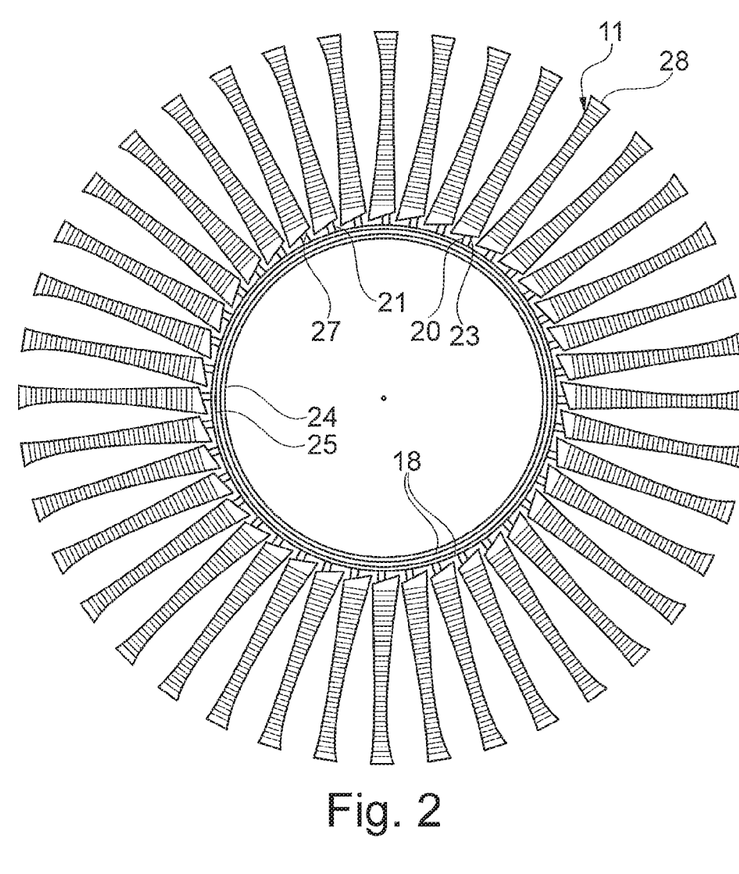
FIG. 2 shows a view of the outlet guide vane arrangement of FIG. 1 in isolation; multiple guide vanes.

FIG. 2 shows an arrangement with multiple guide vanes 11 that are arranged in the circumferential direction, with a channel 21 being conducted through them, through which a fluid to be cooled flows, which in this case is oil. In the area of a guide vane root 27 of the guide vane 11 that radially faces the engine axis A, oil is fed from a hot fluid conduit 22 into an inlet 20 of the channel 21, and inside it is conducted into the interior in the direction of a guide vane tip 28 and back again to an outlet 23 that is also arranged in the area of the guide vane root 27, and is discharged in a cooled state from the channel 21 into a cold fluid conduit 24.

In the embodiment that is shown here, the hot fluid conduit 22 and the cold fluid conduit 24 are connected to at least one aggregate 18 that is to be supplied with oil, such as a gear box that is symbolically indicated in FIG. 2, for example. Here, the oil that is heated up in the aggregate 18 is conducted via the hot fluid conduit 22 from the aggregate 18 to the inlet 20 of the channel 21, and after having been cooled in the guide vane 11 is conducted back to the aggregate 18 from the channel 21 via its outlet 23 and the cold fluid conduit 24.

Figure 3:
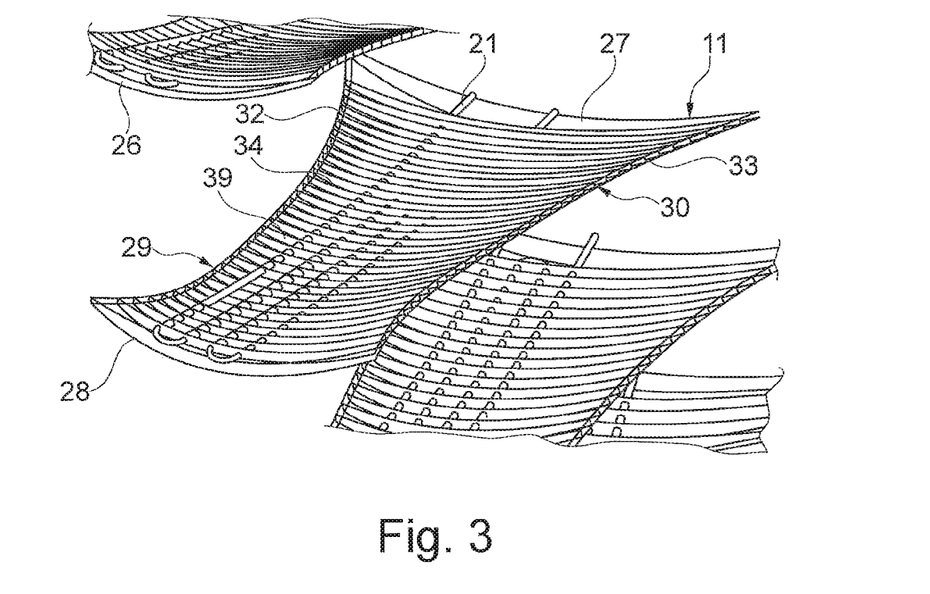
FIG. 3 shows a three-dimensional partial view of multiple guide vanes of FIG. 1 and FIG. 2, wherein a pressure-side wall is rendered as being transparent.
Figure 4:
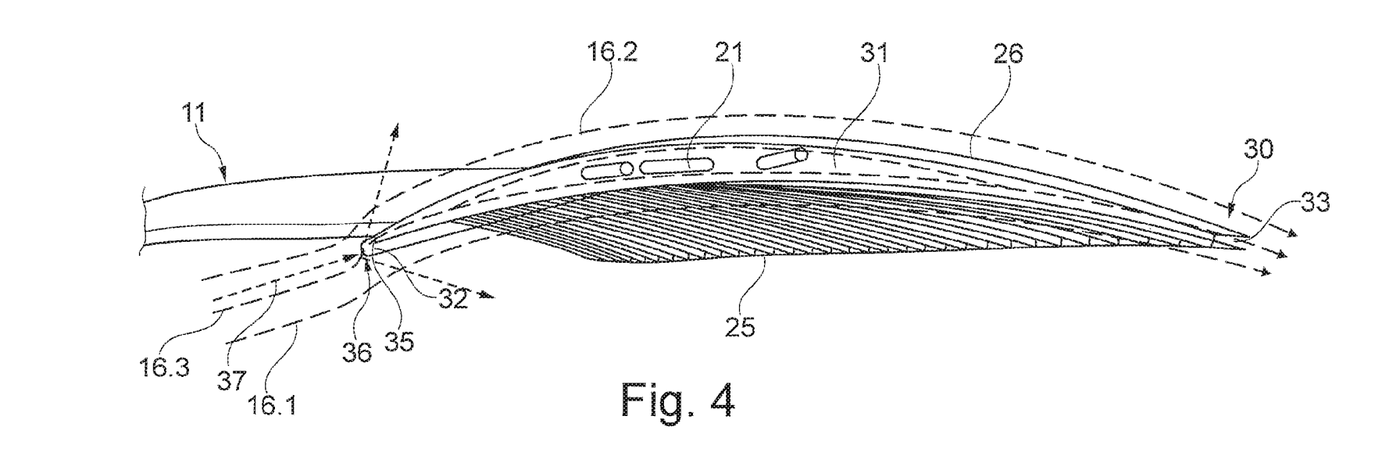
FIG. 4 shows a schematic sectional view of a guide vane of FIG. 1 to FIG. 3, wherein a cooling air flow conduction can be seen.
Figure 5:
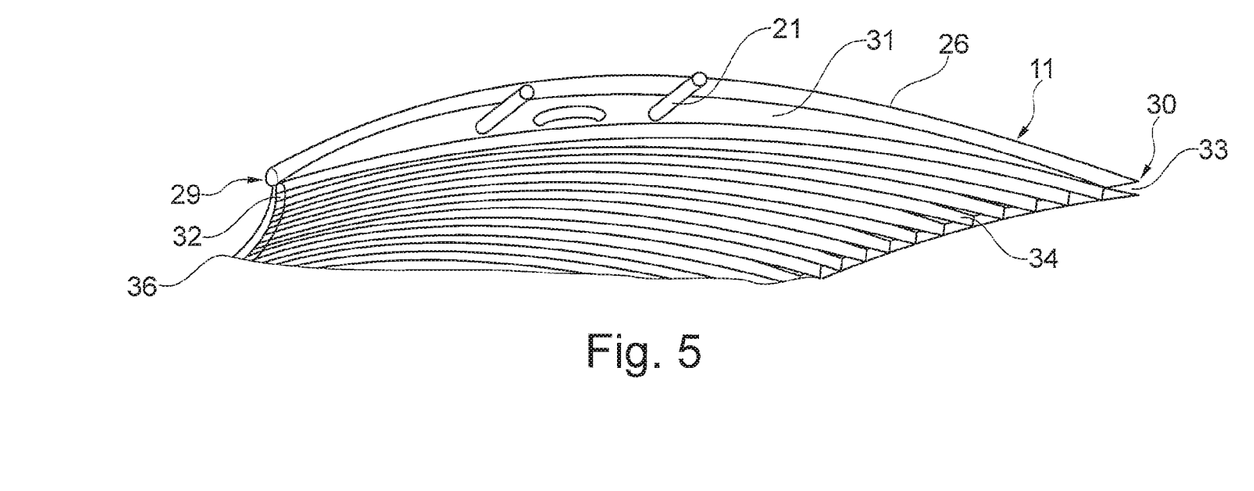
FIG. 5 shows another schematic cross-sectional view of the guide vane of FIG. 4.

FIG. 3 to FIG. 5 provide an illustration of the structure of the cooled guide vanes 11, having a pressure-side concavely curved wall 25, which is shown to be transparent with a view to clarity, and a suction-side convexly curved wall 26 on a side that is facing away from the pressure-side wall 25.

As the first part 16.1 of the cooling air flow 16 flows around the pressure-side wall 25, the flow velocity of this part 16.1 of the cooling air flow 16 is reduced relative to the flow velocity that the cooling air flow 16 has before flowing around the pressure-side wall 25. At the same time, the pressure in the first part 16.1 of the cooling air flow 16 that is acting on the pressure-side wall 25 of the guide vane 11 is increased.

In contrast to that, the flow velocity of a second part 16.2 of the cooling air flow 16, which flows around the suction-side wall 26 of the guide vane 11, increases as it flows around the suction-side wall 26 relative to the flow velocity of the cooling air flow 16 before it flows around the suction-side wall 26. As the flow velocity of the second part 16.2 of the cooling air flow 16 increases, its pressure drops, which results in a suction effect.

Between the guide vane root 27 and the—with respect to the engine axis A—radially outer guide vane tip 28, the guide vane 11 is formed with a guide vane leading edge area 29 on the side that is facing towards the inflowing cooling air flow 16, and with a guide vane trailing edge area 30 on the side that is facing away from the guide vane leading edge area 29, in between which the guide vane 11 has a cavity or an internal space 31 including the oil-conducting channel 21.

The cooling air flow 16 that impinges on the guide vane leading edge area 29 is not only divided into the first part 16.1 of the cooling air flow 16 that flows around the exterior of the pressure-side wall 25 and the second part 16.2 of the cooling air flow 16 that flows around the exterior of the suction-side wall 26, but a part of the cooling air flow 16 is also conducted as a third part 16.3 into the internal space 31 of the guide vane 11 through multiple air inlet openings 32 inside the guide vane leading edge area 29. Inside the internal space 31 of the guide vane 11, the third part 16.3 of the cooling air flow 16 flows around the oil-conducting channel 21 and all adjacent walls, before exiting the guide vane 11 through multiple air outlet openings 33 in the guide vane trailing edge area 30.

Multiple ribs 34 are arranged in the longitudinal direction from the guide vane leading edge area 29 to the guide vane trailing edge area 30, supporting the pressure-side wall 25 and the suction-side wall 26 against each other. The internal space 31 is divided by the ribs 34 into a plurality of individual chambers 39, wherein the ribs 34 are passed multiple times by the channel 21 that extends in a meandering shape.

The cooling air that is conducted through the air inlet openings 32 into the internal space 31 of the guide vane 11 flows through the chambers 29 in between the ribs 34 and around the channel 21 to be cooled, all the way to the air outlet openings 33, wherein the incident flow of the cooling air on the ribs 34, which are heated up by the channel 21 due to being connected to the same, increases the cooling effect.

A lip 35 is arranged in the guide vane leading edge area 29, and is attached to the guide vane leading edge area 29 at the suction-side wall 26 and protrudes over the air inlet openings 32, that is, it projects in an angled manner, so that the clearance between the pressure-side wall 25 and the suction-side wall 26, which comprises the air inlet openings 32, as seen in the flow direction of the cooling air flow 16, is covered. However, on the pressure side a clearance remains between the front end of the lip 35 and the edge of the pressure-side wall 25 in the guide vane leading edge area 29, through which the third part 16.3 of the cooling air that is to be fed into the internal space 31 of the guide vane 11 can flow into the interior of the guide vane. Thus, as it flows in, the third part 16.3 of the cooling air flow 16 that is introduced into the internal space 31 in this manner changes its direction in the direction of the suction side.

Thus, the lip 35 forms a cooling air flow diverter 36, which serves as a particle deflector against harmful particles 37. If a harmful particle that is conveyed in the cooling air flow 16 towards the guide vane 11 impinges on the lip 35, the harmful particle is deflected in the direction of the suction side or the pressure side and does not enter the internal space 31 of the guide vane 11.

Although other particle deflectors against harmful particles, for example based on a screening principle, are also conceivable, the lip 35 is characterized by a simple and maintenance-free construction, while at the same time providing a high degree of effectiveness.

PARTS LIST

1 aircraft engine
2 engine cowling
3 inner lateral wall
4 bypass channel
5 inner dividing wall
6 core flow channel
7 compressors
8 combustion chamber
9 turbine
10 nozzle
11 guide vane, outlet guide vane (OGV)
12 inflow
13 fan
14 air flow
15 flow divider
16 cooling air flow, core flow
16.1 first part of the cooling air flow
16.2 second part of the cooling air flow
16.3 third part of the cooling air flow
17 cooling air flow, bypass flow
18 aggregate
19 guide vane, inlet guide vane (IGV)
20 inlet
21 channel
22 hot fluid conduit
23 outlet
24 cold fluid conduit
25 pressure-side wall
26 suction-side wall
27 guide vane root
28 guide vane tip
29 guide vane leading edge area
30 guide vane trailing edge area
31 internal space
32 air inlet opening
33 air outlet opening
34 rib
35 lip 36 protective device, cooling air flow diverting appliance
37 harmful particles
39 chamber
A central engine axis

The invention claimed is:

1. A guide vane of a gas turbine aircraft engine comprising:
   a concave pressure-side wall;
   a convex suction-side wall opposite and facing away from the concave pressure-side wall;
   a guide vane root;
   a guide vane tip;
   an internal space of the guide vane;
   a guide vane leading edge area which directs a first part of a cooling air flow around the concave pressure-side wall, a second part of the cooling air flow around the convex suction-side wall, and a third part of the cooling air flow through the internal space of the guide vane;
   a fluid conducting cooling channel arranged in the internal space of the guide vane and exposed to the third part of the cooling air flow through the internal space; and
   a guide vane trailing edge area facing away from the guide vane leading edge area;
   wherein the internal space of the guide vane connects to an air inlet opening arranged in the guide vane leading edge area to direct the third part of the cooling air flow through the internal space of the guide vane, and wherein the internal space of the guide vane connects to an air outlet opening arranged in the guide vane trailing edge area; and
   a particle deflector formed as a lip which protrudes over the air inlet opening in the guide vane leading edge area.

2. The guide vane according to claim 1, wherein the particle deflector is curved such that a direction of the cooling air flow is changed as the cooling air flow flows in the internal space.

3. The guide vane according to claim 1, wherein the particle deflector protrudes over the air inlet opening by a clearance that is determined by a distance between the concave pressure-side wall and the convex suction-side wall such that the third part of the cooling air flow flows into the air inlet opening between the lip and the concave pressure-side wall with a flow direction that is oriented towards the convex suction-side wall.

4. The guide vane according to claim 1, further comprising a plurality of ribs in contact with at least one chosen from the concave pressure-side wall and the convex suction-side wall, and wherein the plurality of ribs are arranged in the internal space of the guide vane and exposed to the third part of the cooling air flow through the internal space.

5. The guide vane according to claim 4, wherein the plurality of ribs extend in a direction from the guide vane leading edge area to the guide vane trailing edge area.

6. The guide vane according to claim 4, wherein the plurality of ribs are in contact with the fluid conducting cooling channel.

7. The guide vane according to claim 4, wherein at least part of the fluid conducting cooling channel passes through the plurality of ribs.

8. The guide vane according to claim 1, wherein the fluid conducting cooling channel is arranged in a meandering shape in the internal space of the guide vane.

9. The guide vane according to claim 1, further comprising:
   a fluid inlet of the fluid conducting cooling channel, wherein the fluid inlet is arranged for taking in a fluid to be cooled from a hot fluid conduit, and
   a fluid outlet of the fluid conducting cooling channel, wherein the fluid outlet is arranged at the guide vane root to discharge a cooled fluid from the guide vane into a cold fluid conduit.

10. The guide vane according to claim 1, wherein the internal space of the guide vane is divided into multiple chambers.

11. A gas turbine engine, comprising the guide vane according to claim 1, wherein the guide vane is arranged in a bypass channel or a core flow channel of the gas turbine engine.

12. A guide vane of a gas turbine aircraft engine comprising:
   a pressure-side wall;
   a suction-side wall;
   an internal space of the guide vane;
   a guide vane leading edge area which directs a first part of a cooling air flow around the pressure-side wall, a second part of the cooling air flow around the suction-side wall, and a third part of the cooling air flow through the internal space of the guide vane;
   a fluid conducting cooling channel arranged in the internal space of the guide vane and exposed to the third part of the cooling air flow through the internal space;
   a guide vane trailing edge area facing away from the guide vane leading edge area;
   a cooling air flow diverter;
   a lip, wherein the lip forms the cooling air flow diverter; and
   an air inlet opening, wherein the lip protrudes over the air inlet opening in the area of the guide vane leading edge.

13. The guide vane according to claim 12, wherein the lip protrudes over the air inlet opening by a clearance that is determined by a distance between the pressure-side wall and the suction-side wall such that the cooling air flow flows into the air inlet opening between the lip and the pressure-side wall with a flow direction that is substantially oriented towards the suction-side wall.

* * * * *